United States Patent Office 3,250,801
Patented May 10, 1966

3,250,801
PROCESS FOR PREPARATION OF BIS-ALLYL ESTERS FROM A DICARBOXYLIC ACID ANHYDRIDE AND AN ALLYL HALIDE
Hugo Stange, Princeton, N.J., and William B. Tuemmler, Catonsville, Md., assignors to FMC Corporation, New York, N.Y., a corporation of Delaware
No Drawing. Filed Dec. 17, 1962, Ser. No. 244,867
The portion of the term of the patent subsequent to Apr. 23, 1980, has been disclaimed
10 Claims. (Cl. 260—468)

This is a continuation-in-part of copending application Serial No. 18,508, filed March 30, 1960, now abandoned.

This invention relates to an improved method of preparing allylic esters of dibasic acids, and particularly to a novel process for the preparation of diallylic esters of dicarboxylic acids.

Allylic esters of dicarboxylic acids have heretofore been prepared by a number of standard esterification procedures. For example, the reaction of allylic halides with metal salts of dicarboxylic acids has been described, in both aqueous and anhydrous systems, usually in the presence of a tertiary amine catalyst. This esterification is a two-step reaction, requiring first the preparation of the metal salt of the acid, and second, the reaction of the metal salt with the allylic halide. The requirement in this process for initial preparation of the metal salt from the dicarboxylic acid, before the actual esterification, is accompanied by several disadvantages: in anhydrous systems, the process of preparing the anhydrous metal salt is time consuming, since the salt must be prepared in aqueous solutions and subsequently dried, and requires special equipment due to corrosion problems; if the metal salt is prepared and used in aqueous medium, substantial decomposition of the allylic halide in the subsequent esterification may occur due to its instability in the presence of water; and there is the economic disadvantage of requiring an additional operation in the overall synthesis. Yet, heretofore, no procedure has been provided for the direct reaction, in one step, of a dicarboxylic acid or anhydride with an allylic halide.

Another process which has been used for the preparation of diallylic esters is the directed esterification of a dicarboxylic acid or anhydride with an allylic alcohol. This process is also accompanied by serious disadvantages, in addition to the economic disadvantage of using the more expensive allylic alcohol rather than the corresponding halide. Excess alcohol is required to complete the reaction, and to compensate for alcohol lost through by-product ether formation and through polymerization of the alcohol at the prolonged processing times at elevated temperatures. Additional problems arise since allyl alcohols tend to isomerize irreversibly to the isomeric aldehydes under the acidic conditions of esterification.

Thus, the object of the present invention is to provide a process for the preparation of diallylic esters which is free of the disadvantages of the prior art processes.

A further object is to provide a one-step process for the preparation of diallylic esters from dicarboxylic acid anhydrides.

A further object is to provide an efficient method for the preparation of diallylic esters without the intermediate preparation of the metal salt.

A further object is to provide a simpler and more economical process for the preparation of diallylic esters than was heretofore available.

These and other objects will become apparent from the following description of the invention.

It has now been discovered that a dicarboxylic acid anhydride can indeed be esterified directly with an allylic halide, to produce a diallylic ester in one step, without either the intermediate preparation of the metal salt, as was heretofore necessary, or the use of allyl alcohol. This one-step synthesis is accomplished by reacting a cyclic anhydride of a dicarboxylic acid with equivalent amounts of sodium carbonate and an allylic halide, under substantially anhydrous conditions, employing a quaternary ammonium salt as catalyst. When these reactants are combined, the diallyl ester is formed under unusually mild conditions, normally in the range of 75° to 150° C.— a particularly surprising result in view of the much higher temperatures required for the anhydrous reaction of phthalic acid with sodium carbonate, and suggesting that the mechanism of this reaction may actually be different from that of the two-step process of the prior art.

The process of this invention is illustrated in the following equation for the reaction of phthalic anhydride with allyl chloride:

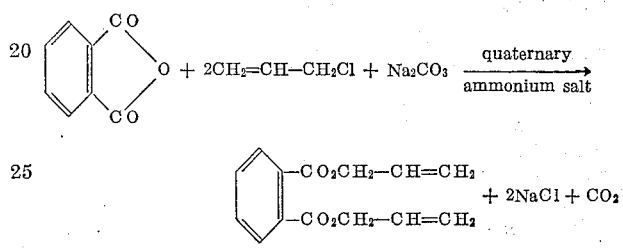

In the above formulae, the allylic halide may be the chloride, as shown, or other halides, such as the bromide and iodide. The chloride is generally preferred, for economy and availability. The allylic group may be allyl as shown, or substituted allyl, such as methallyl, crotyl, or 2-octenyl.

The anhydrides which are suitable for the reaction of this invention are the cyclic anhydrides of dicarboxylic acids. Not all dicarboxylic acids form cyclic anhydrides. As a general rule, cyclic anhydrides will form when the anhydride is capable of forming as a 5 or 6 membered ring. Suitable acids which form cyclic anhydrides include saturated and unsaturated aliphatic dicarboxylic acids such as succinic, maleic and glutaric and alkyl, alkenyl and aryl substituted derivatives of these acids such as citraconic, itaconic, phenylmaleic and phenylsuccinic, diglycolic acid, aromatic dicarboxylic acids such as phthalic acid and substituted derivatives of phthalic acid such as hexahydrophthalic, tetrahydrophthalic, endomethylene-tetrahydrophthalic and 3-chlorophthalic acids. Alkylated maleic anhydrides resulting from the reaction of maleic anhydride with hydrocarbons such as toluene, xylene, cumene, diisobutylene, tripropylene and tetrapropylene are also suitable. In general, the exact structure of the anhydride is unimportant provided it is a cyclic anhydride of a dicarboxylic acid.

The reaction requires two moles of allylic halide to react with each mole of the dicarboxylic acid anhydride. A slight excess of allylic halide may be used, to provide a solvent for the product and to compensate for any losses during the reaction. Unreacted allylic halide may be recovered or recycled. If desired, an inert solvent or heel of the product may be present, to control the reaction temperature or facilitate contact among the reactants. The reaction proceeds under completely anhydrous conditions, or in the presence of traces of water, which traces do not negate the substantially anhydrous reaction condition.

An equivalent amount of sodium carbonate is consumed in the reaction. This reactant, in anhydrous form, should be thoroughly mixed with the anhydride for optimum results in this heterogeneous reaction. If desired, excess sodium carbonate may be present.

The quaternary ammonium salt used as catalyst may be any that is at least partially soluble in the reaction medium. The quaternary ammonium salt may be derived from an extremely wide variety of substituent groups, and the particular quaternary salt used is not critical. The substituent groups may be alkyl, from methyl up to fatty chains of 24 or more carbon atoms, and mixtures thereof, or aralkyl such as benzyl or phenylethyl, or unsaturated aliphatic groups, including alkenyl groups and unsaturated fatty chains, as well as groups derived from cyclic amines such as pyridine, morpholine and the like, and mixtures thereof. The anion of the quaternary salt may be any acid residue, most commonly a halide such as chloride or bromide, or an economical acid residue such as sulfate. Many quaternary ammonium compounds are available in commerce, particularly quaternary ammonium chlorides where the nitrogen is substituted with a combination of lower and long chain alkyl groups. Other quaternary ammonium compounds are readily prepared by reacting the appropriate tertiary amine, including cyclic amines, with an aliphatic halide or sulfate. The structure of the quaternary salt does not determine the composition of the ester formed; that is, the quaternary salt need not be derived from the allylic halide which is a reactant in the esterification.

The quaternary ammonium salt is used in catalytic amounts. Good yields of product, at a relatively rapid rate, are achieved using as little as 2% of catalyst, by weight of anhydride used. In general, increasing the amount of catalyst improves the reaction rate and yield, and excellent results are obtained in the range of about 2–10% catalyst by weight of anhydride. Catalyst concentrations outside of this range may also be employed, depending on the reaction conditions.

The process may be conducted at atmospheric pressure, usually under reflux conditions, or at superatmospheric pressure. Reaction temperatures generally range from about 75° to 150° C., the reaction time decreasing as the temperature increases. At temperatures below about 75° C. the reaction is usually too slow to be practical. The upper temperature limit is controlled by convenience in operation and the stability to polymerization of the reactants and products.

When the reaction is complete the products are separated by standard procedures, including filtration of the inorganic salt produced, recovery of the quaternary ammonium salt and unreacted starting materials if desired, and separation of the ester by standard procedures such as extraction or distillation.

The invention is illustrated further by the following examples. All percentages are by weight.

*Example 1.—Preparation of diallyl phthalate*

A 1-gal. autoclave fitted with a water cooled condenser and gas vent was charged with a mixture of 592 g. of phthalic anhydride, 466 g. of anhydrous sodium carbonate, 765 g. of allyl chloride and 20 g. of allyltriethylammonium chloride and 2.0 g. of 2,2'-methylene bis(4-methyl-6-tert.-butylphenol) as polymerization inhibitor. The mixture was heated at about 130° C. for 4.3 hrs. A maximum pressure of 235 p.s.i.g. was achieved, and a total of about 3.05 cu. ft. of carbon dioxide was collected during the reaction. The crude product was washed with water, and with 5% sodium bicarbonate, to produce 1089 g. of crude material. This was stripped of volatiles at 60° C. and 20 mm. Hg to produce 934 g. of diallyl pthalate, $n_D^{25}$ 1.5175, yield 95% of theoretical.

*Example 2.—Preparation of dimethallyl phthalate*

A stirred mixture of 444 g. of phthalic anhydride, 350 g. of sodium carbonate and 679 g. of freshly distilled (B.P. 71–72° C.) methallyl chloride was heated to 50° C. and then treated with 15 g. of dodecyltrimethylammonium bromide. The resulting mixture was heated under reflux. Heating was continued for 30 hrs., to a total gas evolution of approximately 70 liters. The cooled mixture was treated with 1 liter of water, and the aqueous phase was separated. The chloride ion content of the combined aqueous phases was 5.76 equivalents (96% of theory). Distillation of the organic phase produced 781 g. (95 percent conversion) of dimethallyl phthalate, B.P. 165–175° C. (1 mm.); $n_D^{25}$ 1.5130.

*Example 3.—Preparation of diallyl phthalate*

A mixture of 37 g. of phthalic anhydride, 29.2 g. of sodium carbonate, 100 g. of allyl chloride and 2.7 g. of cetylbenzyldimethylammonium chloride was stirred and heated at 130° C. for 4 hrs. The reaction mixture was then cooled and washed with water to remove inorganic salts. The organic material was stripped of volatiles at reduced pressure to yield 59.5 g. of diallyl phthalate (97% of theory).

*Example 4.—Preparation of dimethallyl tetrahydrophthalate*

To a 30-gal. stainless steel, jacketed reactor equipped with means of vigorous agitation, temperature control, and a 4 in. x 12 ft. distillation column and condenser, were charged 93.7 lbs. of methallyl chloride, 38 lbs. of tetrahydrophthalic anhydride, 31.3 lbs. of dry sodium carbonate, and 1.2 lbs. of allyltrimethylammonium chloride. The reaction mixture was heated for 1 hr. to reflux during which time moderate evolution of carbon dioxide occurred. The boiling methallyl chloride was distilled off through the column and condensed. During the first part of the run the distillate was cloudy and also contained droplets of water but did not separate into layers. Fresh methallyl chloride was added to the reaction mixture to replace the wet material removed. After removal of 3 gal. in this manner, the distillate cleared and the still was returned to total reflux. The reaction was continued at reflux for a total of 72 hrs. under atmospheric pressure and then for 24 hours at 10 p.s.i.g. During this time the pot temperature rose from 76° to 100° C.

The reaction contents were cooled to 55° C. and 10 gal. of water was added with stirring. The aqueous layer was separated and discarded. Two pounds of soda ash was added to the moist oil after which the reaction mixture was slightly alkaline. The oil layer was stripped to 120° C. at 20 mm. Hg to give 98% of the theoretical amount of crude product. This crude product was distilled to give 56.5 lbs. (81.3% of theory) of pure product (101% pure by saponification) boiling at 120–122° C. at 0.5 mm. Hg and having a refractive index of 1.4770 at 25° C.

*Example 5.—Preparation of dimethallyl endomethylenetetrahydrophthalate*

To a 30-gal. reactor similar to that used in Example 4 were charged 93.7 lbs. of methallyl chloride, 38 lbs. of endomethylenetetrahydrophthalic anhydride, 31.3 lbs. of dry sodium carbonate, and 1.3 lbs. allyltrimethylammonium chloride. The reaction mixture was heated for 1 hr. to reflux during which time moderate evolution of carbon dioxide occurred. The boiling methallyl chloride was distilled off and condensed until 5 gal. had been removed, after which the distillate cleared. Fresh methallyl chloride was added to the reaction mixture to replace the wet material removed and the still was returned to total reflux. The reaction was continued at reflux for 72 hrs., at which point no further carbon dioxide was evolved. During this time the pot temperature rose from 76° to 100° C.

The reaction contents were cooled to 55° C. and 10 gal. of water was added with stirring. The aqueous layer was separated and discarded. Soda ash was added to the moist oil until the reaction mixture was slightly alkaline. The oil layer was stripped to 120° C. at 20 mm. Hg to give 83.5% of the theoretical amount of crude product. This product was distilled to give 50.4 lbs.

(69.6% of theory) of pure product (102% pure by saponification) boiling at 260° C. at 0.1 mm. Hg and having a refractive index of 1.4908 at 25° C.

*Example 6.—Preparation of dimethallyl hexahydrophthalate*

To a 30-gal. reactor similar to that used in Example 4, were charged 99.2 lbs. of methallyl chloride, 38.5 lbs. of hexahydrophthalic anhydride, 31.3 lbs. of dry sodium carbonate, and 1.2 lbs. of allyltriethylammonium chloride. The reaction mixture was heated for 1 hr. to reflux during which time moderate evolution of carbon dioxide occurred. The boiling methallyl chloride was distilled off and condensed. Fresh methallyl chloride was added to the reaction mixture to replace the wet material removed. After removal of 6 gal. in this manner, the distillate cleared and the still was returned to total reflux. The reaction was continued at reflux for 72 hrs. until no further carbon dioxide was evolved. During this time the pot temperature rose from 76° to 100° C. The reaction contents were cooled to 55° C. and 10 gal. of water was added with stirring. The aqueous layer was separated and discarded. Soda ash was added to the moist oil until the reaction mixture was slightly alkaline. The oil layer was stripped to 120° C. at 20 mm. Hg to give 78% of the theoretical amount of the crude product. This product was distilled to give 44 lbs. (70.5% of theory) of pure product (100.8% pure by saponification) boiling at 177–119° C. at 0.3 mm. Hg and had a refractive index of 1.4930 at 25° C.

*Example 7.—Preparation of dimethallyl maleate*

A 1-gal. stirred autoclave, equipped with a 4.5 ft. stainless steel condenser was charged with 196 g. of maleic anhydride (2.0 moles), 233 g. of sodium carbonate (2.2 moles), 800 g. of methallyl chloride (8.8 moles), and 8.0 g. of allyltriethylammonium chloride. The mixture was heated with stirring to 130° C. and maintained at that temperature for 5 hrs. Gas was vented during heat-up to prevent the pressure from exceeding 200 p.s.i.g. The reaction mixture was washed with 1 liter of water. Benzene was added to the organic phase to permit azeotropic removal of the water. The dried crude product was then distilled under vacuum in the presence of 0.5 g. of Agerite White. The product had a wide boiling range (58–111° at 1.2 mm. Hg) so the material was rectified using a 1 ft. packed column. A total of 241 g. of product was obtained corresponding to a yield of 54%. Assay of a 209 g. flat-boiling product fraction collected at 101.0° C. at 0.7 mm. Hg showed a purity of 100.3% by saponification. The refractive index was 1.4668 at 25° C.

*Example 8.—Preparation of diallyl maleate*

A 1-gal. stirred autoclave equipped with 4.5 ft. stainless steel condenser was charged with 196 g. of maleic anhydride (2.0 moles), 233 g. of dry sodium carbonate (2.2 moles), 800 g. of allyl chloride (10.4 moles) and 8.0 g. of allyltriethylammonium chloride. The autoclave was sealed and the mixture was heated with stirring to 130° C. After 30 min. a mild pressure increase indicated that the reaction had begun. The reaction mixture was maintained at 130° C. for 6.25 hrs. while the evolved gas was vented at the top of the condenser at such a rate as to limit the pressure to 200 p.s.i.g.

The reaction mixture was washed with 1 liter of water and then with 0.8 liter of 2% sodium bicarbonate. The material was distilled after adding 0.5 g. of Agerite White to inhibit polymerization and 500 ml. of benzene to azeotrope off the water. The product fraction (93 g.) was collected at 98–106° C. at 3 mm. Hg. The product, obtained in 24% yield, analyzed as 99.7% pure by saponification and had a refractive index of 1.4660 at 25° C.

The diallylic esters prepared by the process of this invention are useful monomers for the preparation of synthetic resins, and may be polymerized and copolymerized to form thermoplastic polymers having residual unsaturation, and cross-linked thermosetting resins of superior electrical and mechanical properties.

From the foregoing description and illustrative examples it is apparent that the novel process of this invention is susceptible to numerous modifications and variations within the scope of the disclosure, and it is intended to include such modifications and variations in the following claims.

We claim:

1. The method of producing a diallylic ester of a dicarboxylic acid in one step from a dicarboxylic acid cyclic anhydride and an allylic halide selected from the group consisting of allyl and alkyl substituted allyl chlorides, bromides and iodides which comprises reacting one mole of a dicarboxylic acid cyclic anhydride with one mole of sodium carbonate and two moles of said allylic halide in a single reaction step, in the presence of a catalytic amount of a quaternary ammonium salt which is at least partially soluble in the reaction medium, under substantially anhydrous conditions at a temperature of 75–150° C., thereby directly producing said diallylic ester.

2. The method of claim 1, wherein the allylic halide is allyl chloride.

3. The method of claim 1, wherein the allylic halide is methallyl chloride.

4. The method of claim 1, wherein the cyclic anhydride is a phthalic anhydride.

5. The method of claim 1, wherein the cyclic anhydride is tetrahydrophthalic anhydride.

6. The method of claim 1, wherein the cyclic anhydride is hexahydrophthalic anhydride.

7. The method of claim 1, wherein the cyclic anhydride is endomethylenetetrahydrophthalic anhydride.

8. The method of claim 1, wherein the quaternary ammonium salt is an allyltrialkylammonium halide.

9. The method of producing diallyl orthophthalate in one step from phthalic anhydride and allyl chloride which comprises reacting one mole of phthalic anhydride with one mole of sodium carbonate and two moles of allyl chloride in a single reaction step, in the presence of a catalytic amount of a quaternary ammonium salt which is at least partially soluble in the reaction medium under substantially anhydrous conditions at a temperature of 95–150° C., thereby directly producing diallyl orthophthalate.

10. The method of claim 9, wherein the quaternary ammonium salt is an allyltrialkylammonium halide.

References Cited by the Examiner

UNITED STATES PATENTS

| | | | |
|---|---|---|---|
| 2,062,917 | 12/1936 | Lawson | 260—475 |
| 2,617,820 | 11/1952 | Gamrath et al. | 260—475 |
| 2,939,879 | 6/1960 | De Benedictis | 260—475 |
| 2,992,239 | 7/1961 | Nevin et al. | 260—348.6 |
| 3,035,084 | 5/1962 | Garman et al. | 260—475 |
| 3,086,985 | 4/1963 | Strange et al. | 260—475 |

OTHER REFERENCES

Wagner et al.: "Synthetic Organic Chemistry" (1953), p. 484.

LORRAINE A. WEINBERGER, *Primary Examiner.*

LEON ZITVER, *Examiner.*